(12) United States Patent
Chen et al.

(10) Patent No.: US 7,450,374 B2
(45) Date of Patent: Nov. 11, 2008

(54) MOUNTING APPARATUS FOR DATA STORAGE DEVICE

(75) Inventors: Yun-Lung Chen, Tu-Cheng (TW); Pei-Bin Luo, Shenzhen (CN); Jian-Wei Shi, Shenzhen (CN); Gang Su, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 565 days.

(21) Appl. No.: 11/187,402

(22) Filed: Jul. 21, 2005

(65) Prior Publication Data

US 2006/0139870 A1 Jun. 29, 2006

(30) Foreign Application Priority Data

Dec. 25, 2004 (CN) .................. 2004 2 01035103 U

(51) Int. Cl.
*G06F 1/16* (2006.01)
(52) U.S. Cl. ..................... 361/685; 361/724; 361/726; 312/223.1; 312/223.2; 312/333; 248/220.1
(58) Field of Classification Search .............. 312/223.1, 312/223.2, 333; 248/220.31
See application file for complete search history.

(56) References Cited

U.S. PATENT DOCUMENTS 5,301,088 A * 4/1994 Liu ............................ 361/685

| 5,349,483 | A | 9/1994 | Tsai |
| 6,543,866 | B2 * | 4/2003 | Chen et al. ................ 312/223.2 |
| 6,798,653 | B2 * | 9/2004 | Chen et al. ................... 361/685 |
| 2004/0221441 | A1 * | 11/2004 | Williams ...................... 29/453 |
| 2005/0057895 | A1 * | 3/2005 | Chen et al. ................... 361/685 |
| 2005/0087504 | A1 * | 4/2005 | Wu .............................. 211/26 |
| 2005/0103729 | A1 * | 5/2005 | Chen et al. ..................... 211/26 |
| 2005/0117289 | A1 * | 6/2005 | Han ........................... 361/685 |
| 2005/0190535 | A1 * | 9/2005 | Peng et al. .................. 361/685 |

FOREIGN PATENT DOCUMENTS

TW 389362 5/2000

* cited by examiner

*Primary Examiner*—Jayprakash N Gandhi
*Assistant Examiner*—Anthony Q Edwards
(74) *Attorney, Agent, or Firm*—Morris Manning & Martin; Tim Tingkang Xia, Esq.

(57) ABSTRACT

A mounting apparatus for a data storage device includes a chassis (10), a data storage device (70) with a groove (72) defined in a sidewall thereof, a supporting bracket (20) fixed to the chassis (10), the supporting bracket (20) having a sidewall (24) defining a through hole (31) and a flange (26) defining a through slot (36) therein and a positioning member (50) adapted to be pivotably attached to the supporting bracket (20). The positioning member (50) has a protrusion (57) engaging in the through slot (36) for locating the positioning member (50) and a positioning pin (60) extending through the through hole (31) of the supporting bracket (20) to engage in the groove (72) of the data storage device (70) for securing the data storage device (70) on the chassis (10).

20 Claims, 6 Drawing Sheets

//MOUNTING APPARATUS FOR DATA
STORAGE DEVICE

BACKGROUND OF THE INVENTION

1. Field of the Invention

The present invention relates to a mounting apparatus, and more particularly to a mounting apparatus that secures a data storage device conveniently.

2. Background of the Invention

With the rapid development of computer technology, properties of computer make a dramatic improvement. However, a computer is still expensive for a common consumer. Accordingly, expansion capacity and convenient installation are two vital factors to be considered when designing computer. Various data storage devices are installed in a computer enclosure for communication and dealing with data. Such a device may be, for instance, a hard disk drive, a CD-ROM/DVD-ROM drive, a CD-RW/DVD-RW drive or other similar device. Nowadays, a computer enclosure is tightly packed in order to keep the size of the system small to fit on or under a desk. A conventional data storage device is directly attached to a computer enclosure with screws. However, the screws are usually very small, therefore making it difficult for a computer user to hold the screws in position while screwing them in with a screwdriver. The screws are inserted into holes which are on the data storage device assembly and on the chassis to which the data storage device assembly is being attached. The holes are difficult to align because they are also typically very small. Also, if the tolerances are incorrect due to manufacturing defects, the holes may not line up exactly, making it difficult to insert the screws. Obviously, using screws to attach the data storage device to a computer enclosure may be arduous due to requiring insertion of the screws. Both insertion and removal of the screws are time consuming and cumbersome owing to the work space restrictions and difficult accessibility.

In addition, during the course of the operation of the data storage device, it may cause the data storage device to vibrate, therefore to make the screws come loose. As a result, one danger of damaging the data storage device comes into being. Understandably, some attempts have been taken to introduce a mounting apparatus for a data storage device without screws.

What is needed, therefore, is a mounting apparatus for a data storage device facilitating assembly and disassembly in a chassis.

SUMMARY

A mounting apparatus for a data storage device in accordance with a preferred embodiment of the present invention includes a chassis, a data storage device with a groove defined in a sidewall thereof, a supporting bracket securely mounted to the chassis and a positioning member adapted to be pivotably mounted to the supporting bracket. The supporting bracket has a sidewall defining a through hole and a flange defining a through slot therein. The positioning member has a protrusion abutting against the through slot for locating the positioning member and a positioning pin extending through the through hole to engage in the groove for securing the data storage device on the chassis.

Other advantages and novel features of the present invention will be drawn from the following detailed description of preferred embodiment of the present invention with the attached drawings, in which:

DETAILED DESCRIPTION OF THE INVENTION

Figure 1:
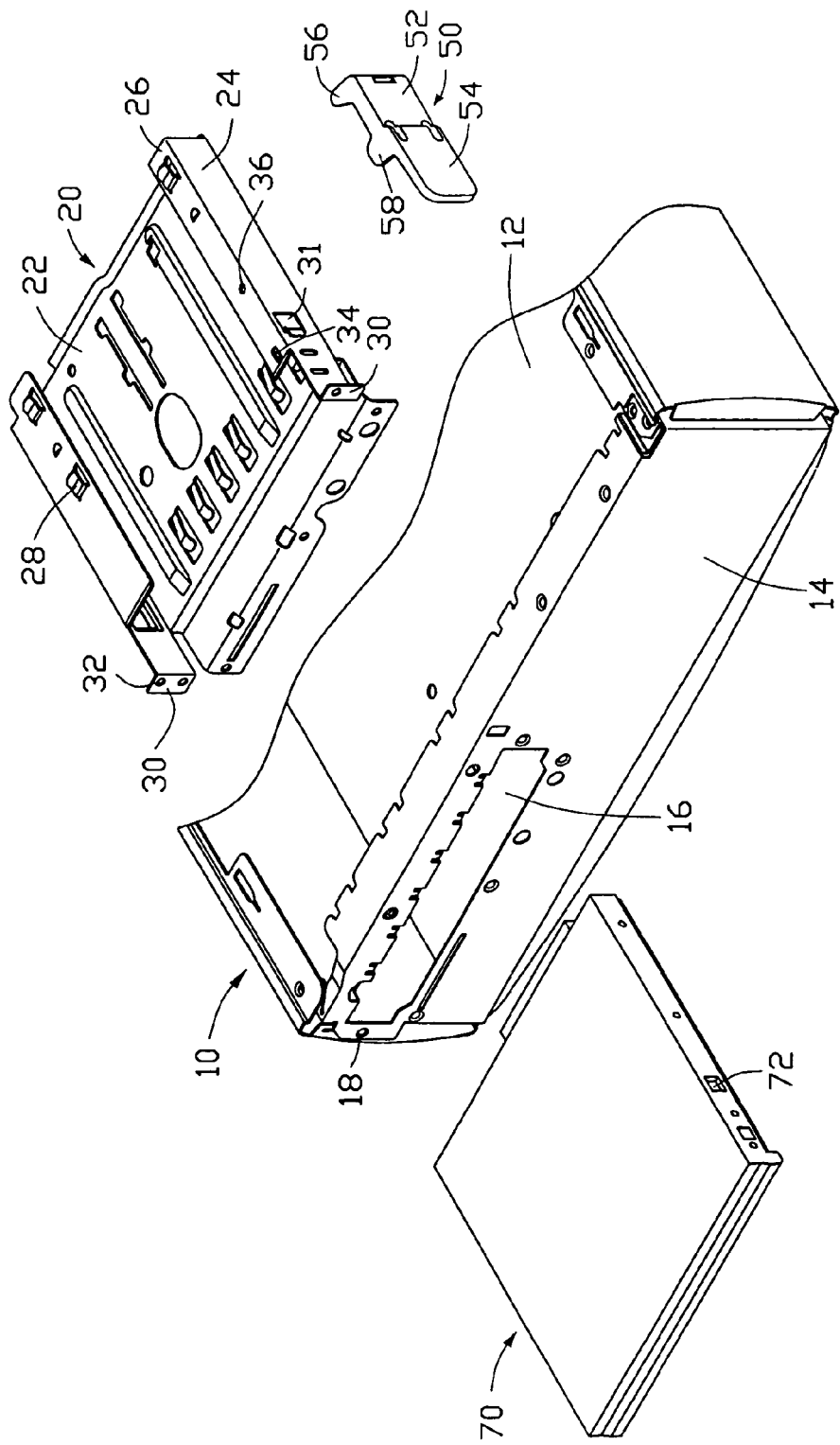
FIG. 1 is an exploded, isometric view of a mounting apparatus for a data storage device in accordance with a first preferred embodiment of the present invention including a positioning member, a supporting bracket and a chassis.

Referring to FIG. 1, a mounting apparatus for a data storage device 70 of an electronic device like a computer in accordance with a first preferred embodiment of the present invention includes a chassis 10, a supporting bracket 20, and a positioning member 50.

The chassis 10 includes a bottom panel 12 and a front panel 14 perpendicular to the bottom panel 12. An elongated opening 16 is defined in the front panel 14. A rivet hole 18 is defined in the front panel 14 at two opposite sides of the opening 16.

The supporting bracket 20 is fixed to the front panel 14 of the chassis 10. The supporting bracket 20 includes a bottom wall 22 and two opposite sidewalls 24 extending vertically and upwardly from the bottom wall 22. Each sidewall 24 is bent inwards to form a flange 26 parallel to the bottom wall 22. A plurality of elastic tabs 28 are formed on the flange 26 and the bottom wall 22 for preventing or minimizing electromagnetic radiation from exiting a computer. Each sidewall 24 is also bent vertically and outwards to form a flange 30 at front end thereof. Amounting hole 32 corresponding to the rivet hole 18 of the chassis 10 is defined in the flange 30. A through hole 31 is defined in the sidewall 24 of the supporting bracket 20. A pair of pivoting holes 34 is defined in the flange 26 and the bottom wall 22. A pair of through slots 36 is also defined in the flange 26 and the bottom wall 22. The pivoting hole 34 and the through slot 36 are close to the through hole 31.

The data storage device 70 may be a CD-ROM drive or other devices, such as a DVD-ROM drive, a CD-RW drive, a DVD-RW drive and so on. The data storage device 70 includes a sidewall with a groove 72 defined therein.

Figure 2:
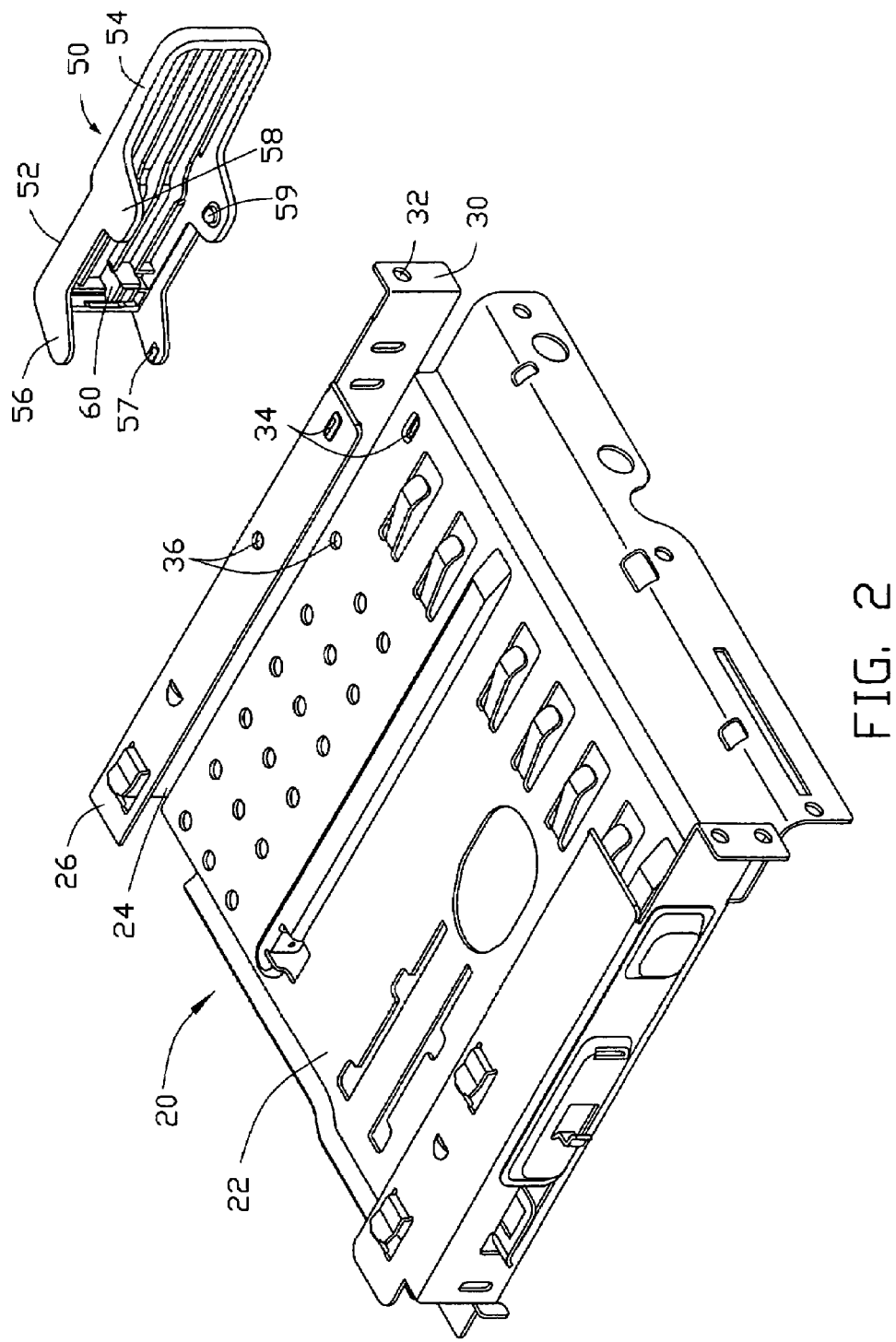
FIG. 2 is an enlarged, isometric view of the supporting bracket and the positioning member of FIG. 1, but viewed from another aspect.

Referring to FIG. 2, the positioning member 50 is pivotably mounted to the supporting bracket 20. The positioning member 50 includes a locking portion 52 and an unlocking portion 54. A pair of opposite locking tabs 56 extends inwards from the locking portion 52. A protrusion 57 is formed on an inner side of each locking tab 56. A pair of opposite supporting tabs 58 extends inwards form a middle portion of the positioning member 50. A pair of locating posts 59 is formed on an inner side of the two opposite supporting tabs 58, respectively. A positioning pin 60 extends vertically and inwardly from an inner side of the locking portion 52 of the positioning member 50.

Figure 3:
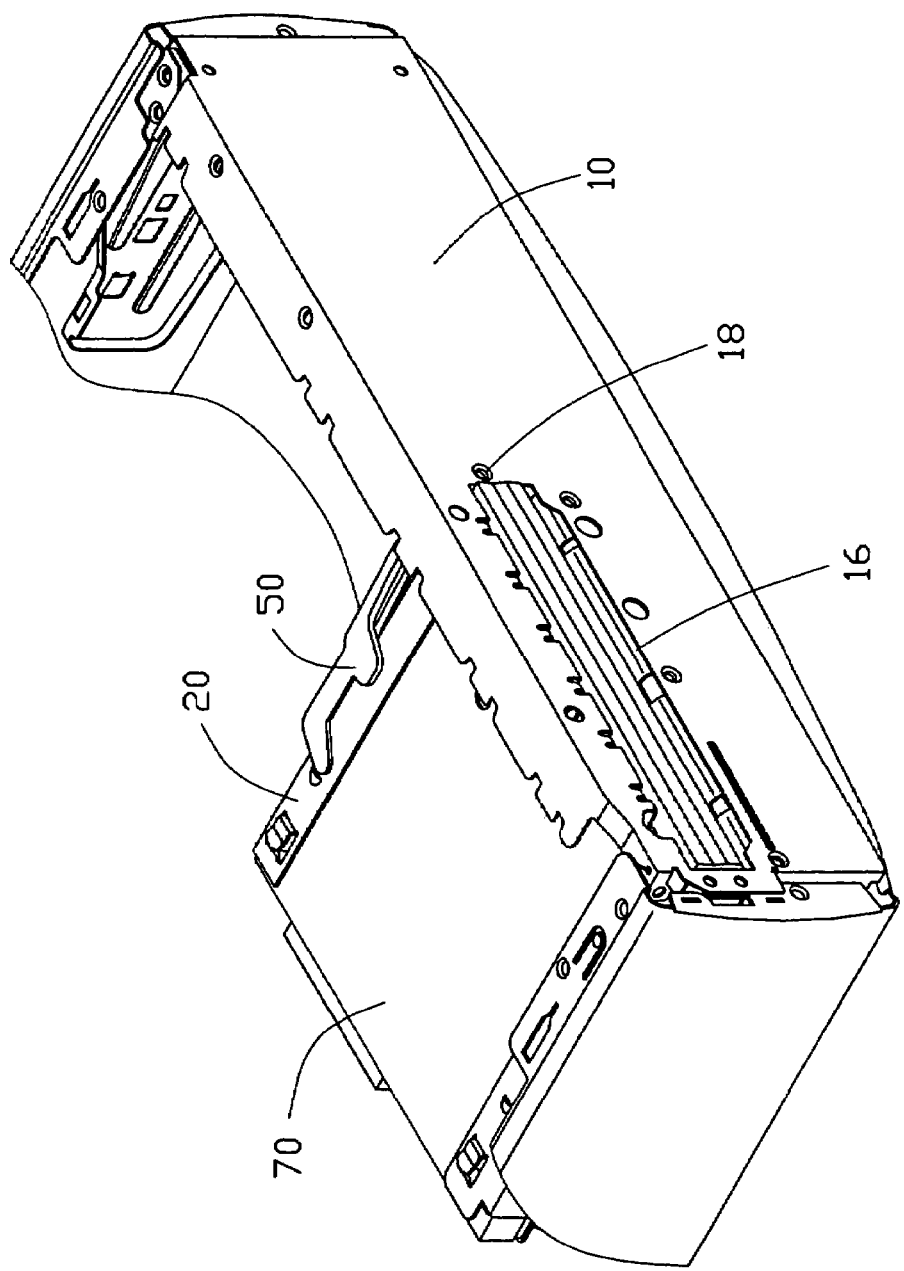
FIG. 3 is an assembled isometric view of FIG. 1.

Referring also to FIG. 3, before the data storage device 70 is mounted to the chassis 10, a rivet (not shown) is extended through the rivet hole 18 of the front panel 14 of the chassis 10 and the mounting hole 32 of the supporting bracket 20 for securing the supporting bracket 20 on the chassis 10. The two locating posts 59 of the positioning member 50 are respectively received into the two pivoting holes 34 of the supporting bracket 20 so that the positioning member 50 can pivot on the sidewall 24 of the supporting bracket 20.

In assembly of the data storage device 70, firstly, the data storage device 70 is inserted into the supporting bracket 20 from the opening 16 of the chassis 10 until the groove 72 of the data storage device 70 is in alignment with the through hole 31 of the sidewall 24 of the supporting bracket 20. Then, the locking portion 52 of the positioning member 50 is pressed inwards so that the positioning member 50 is pivoted towards the data storage device 70 to have the positioning pin 60 extending through the through hole 31 and inserting in the groove 72 of the data storage device 70. Simultaneously, the protrusions 57 of the positioning member 50 engage in the through slots 36 of the supporting bracket 20 for locating the positioning member 50. Thereby, the data storage device 70 is securely attached to the chassis 10.

In disassembly of the data storage device 70, when the unlocking portion 54 of the positioning member 50 is pressed inwards, in light of principle of lever, the locking portion 52 moves outwards so that the protrusions 57 of the locking tab 56 disengage from the through slots 36 of the sidewall 24 of the supporting bracket 20. Simultaneously, the positioning pin 60 also disengages from the groove 72 of the data storage device 70. Thus, the data storage device 50 can be easily taken out from the chassis 10.

Figure 4:
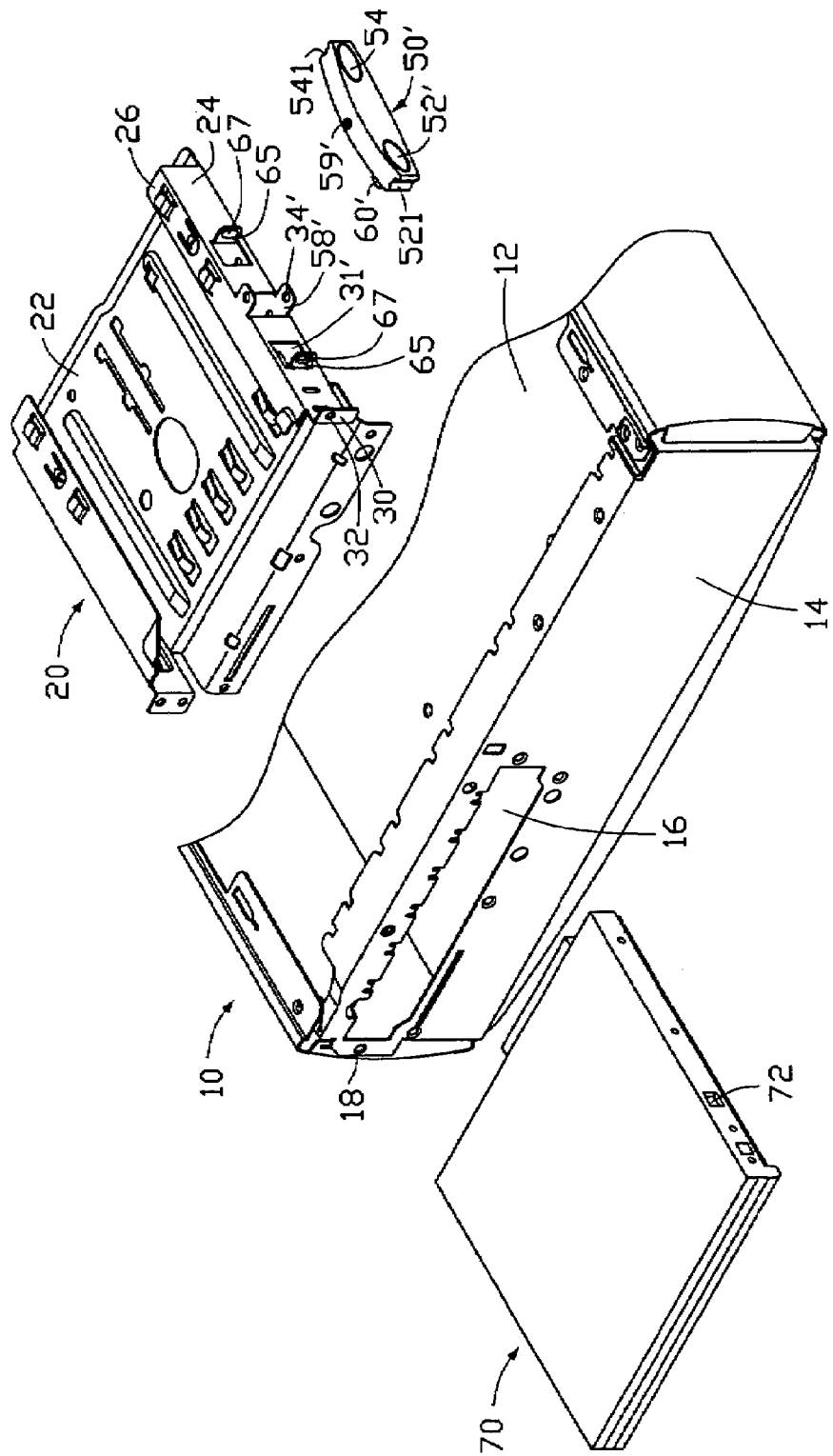
FIG. 4 is an exploded, isometric view of a mounting apparatus for a data storage device in accordance with a second preferred embodiment of the present invention including a positioning member, a supporting bracket and a chassis.
Figure 5:
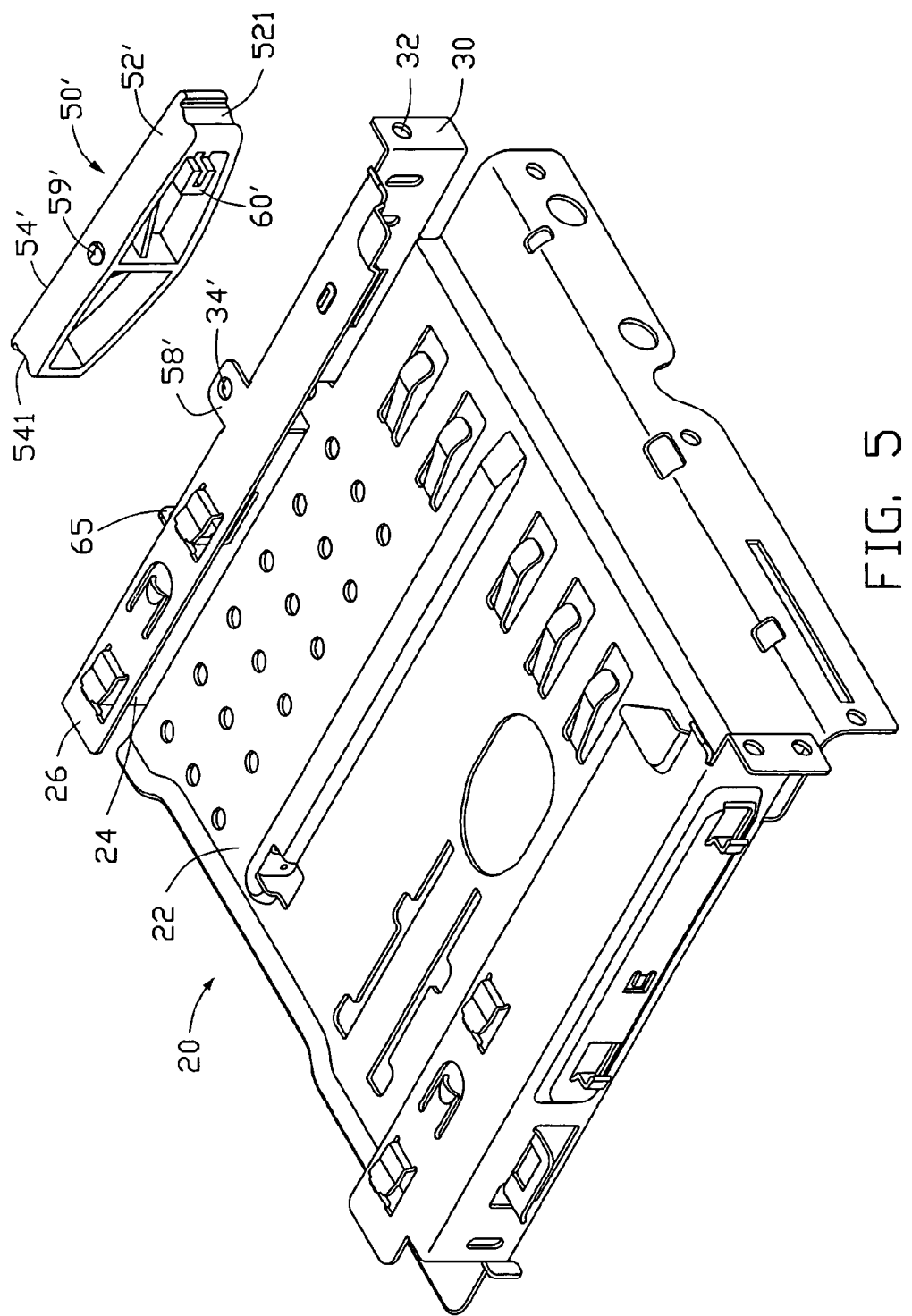
FIG. 5 is an enlarged, isometric view of the supporting bracket and the positioning member of FIG. 4, but viewed from another aspect.
Figure 6:
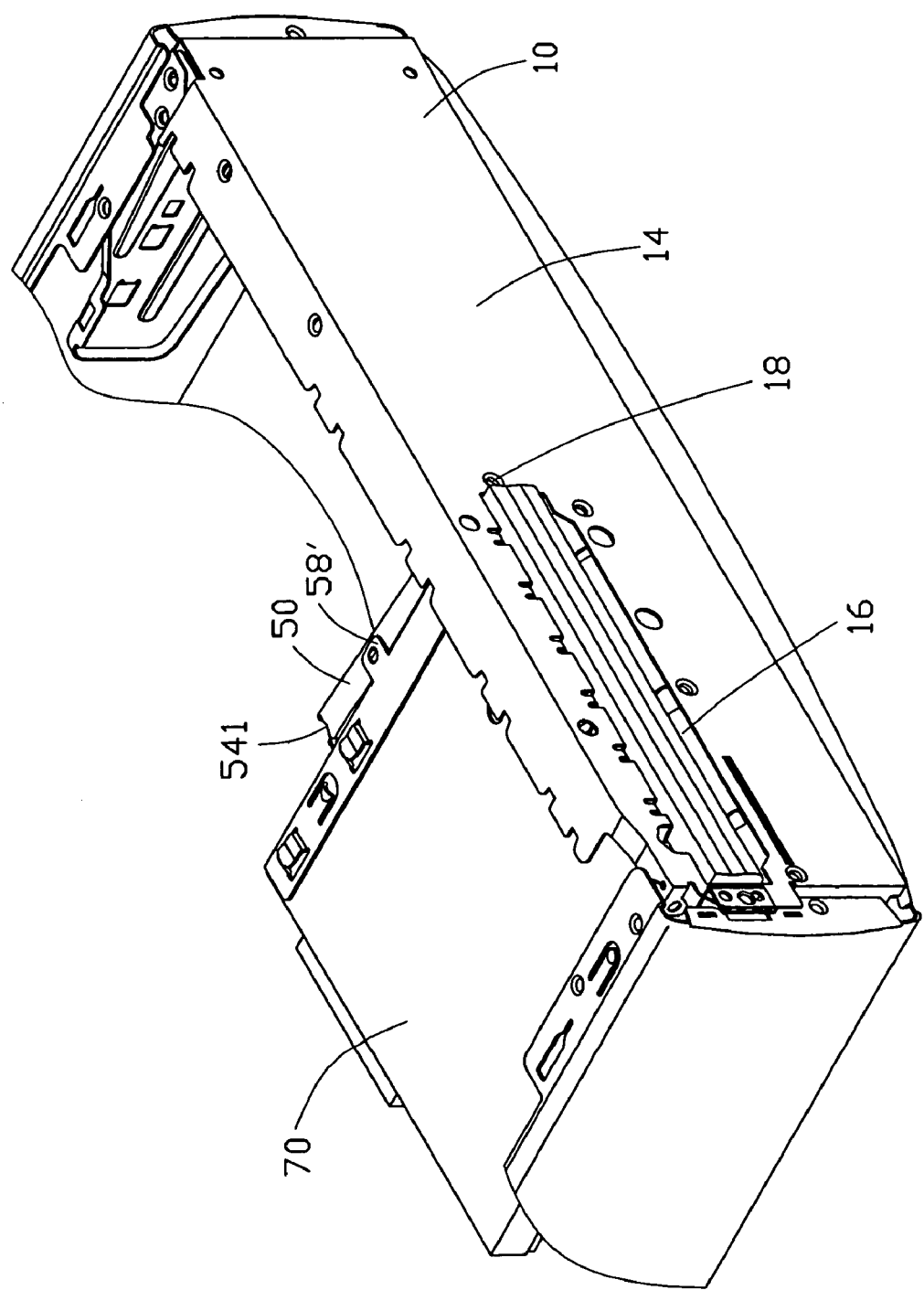
FIG. 6 is an assembled isometric view of FIG. 4.

Referring to FIGS. 4, 5 and 6, a mounting apparatus for a data storage device in accordance with a second preferred embodiment of the present invention includes the chassis 10, a supporting bracket 20, a positioning member 50'. In the second preferred embodiment of the present invention, above-mentioned members such as the chassis 10, the data storage device 70 is the same to the first preferred embodiment of the present invention. Therefore, the label of members is not changed and follows the label of members of the first preferred embodiment of the present invention. However, the supporting bracket 20 in the second preferred embodiment of the present invention makes some modifications. The difference of the supporting bracket 20 in the second preferred embodiment comparing with the supporting bracket 20 in the first preferred embodiment is: a pair of supporting tabs 58' is extended horizontally and outwards from the sidewall 24 of the supporting bracket 20 in the second preferred embodiment. A pivoting hole 34' is defined in each supporting tab 58'. A pair of locking tabs 65 is extended vertically and outwards from the sidewall 24 of the supporting bracket 20. A protrusion 67 is formed on each locking tab 65. A through hole 31' is defined in the sidewall 24 of the supporting bracket 20 adjacent to the front locking tab 65.

The positioning member 50' is pivotably mounted to the sidewall 24 of the supporting bracket 20. The positioning member 50' includes a locking portion 52' and an unlocking portion 54' are formed on the front portion and rear portion thereof. One recess 521 is defined at one end of the locking portion 52' and the other recess 541 is defined at opposite end of the unlocking portion 54'. A pair of locating posts 59' is formed on an upper and lower sides of the positioning member 50'. A positioning pin 60' extends vertically and inwardly from an inner side of the locking portion 52' of the positioning member 50'.

Before the data storage device 70 is mounted to the chassis 10, a rivet (not shown) extends through the rivet hole 18 of the front panel 14 of the chassis 10 and the mounting hole 32 of the supporting bracket 20 for securing the supporting bracket 20 on the chassis 10. The two locating posts 59' of the positioning member 50' are respectively received into the two pivoting holes 34' of the supporting bracket 20 so that the positioning member 50' can pivot on the sidewall 24 of the supporting bracket 20.

In assembly of the data storage device 70, firstly, the data storage device 70 is inserted into the supporting bracket 20 from the opening 16 of the chassis 10 until the groove 72 of the data storage device 70 is in alignment with the through hole 31' of the sidewall 24 of the supporting bracket 20. Then, the locking portion 52' of the positioning member 50' is pushed inwards so that the locking portion 52' of the positioning member 50' is pivoted towards the data storage device 70 to have the positioning pin 60' extending through the through hole 31' and inserting in the groove 72 of the data storage device 70. Simultaneously, the protrusion 67 of the locking tab 65 of the supporting bracket 20 engages in the recess 541 of the positioning member 50' for locating the positioning member 50'. Thereby, the data storage device 70 is securely attached to the chassis 10.

In disassembly of the data storage device 70, when the unlocking portion 54 of the positioning member 50 is pushed inwards, the protrusion 67 of the locking tab 65 of the supporting bracket 20 disengages from the recess 541 of the positioning member 50'. In light of principle of lever, the locking portion 52' moves outwards so that the protrusion 67 of the locking tab 65 engages in the recess 521 of the positioning member 50', thereby locating the positioning member 50'. Simultaneously, the positioning pin 60' also disengages from the groove 72 of the data storage device 70. Thus, the data storage device 50 can be easily taken out from the chassis 10.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

We claim:

1. An electronic device comprising:
   a data storage device with a groove defined aside;
   a supporting bracket disposed in the electronic device for receiving the data storage device therein and allowing the data storage device movable in and out, the supporting bracket having a sidewall defining a through hole capable of aligning with the groove when the data storage device moves to a final position thereof for being retainably received in the supporting bracket; and
   a positioning member pivotally mounted to the sidewall of the supporting bracket beside the through hole along an axis, the positioning member comprising a locking portion thereof extending away from the axis along a first direction and an unlocking portion extending away from the axis along a second direction different from the first direction, the locking portion being pivotally movable toward the sidewall to engage with the groove in order for retaining the data storage device in the final position thereof, and the unlocking portion being pivotally movable toward the sidewall to urge pivotal movement of the locking portion away from the groove for releasing the data storage device.

2. The electronic device as recited in claim 1, wherein a flange extends perpendicularly from the sidewall, the flange defines a through slot and the positioning member correspondingly comprises a protrusion, engagement of the through slot and the protrusion is capable of locating the positioning member.

3. The electronic device as recited in claim 2, wherein the flange defines a pivoting hole, and the positioning member further comprises a locating post engaging in the pivoting hole for pivotally mounting the positioning member to the supporting bracket.

4. The electronic device as recited in claim 2, wherein two opposite locking tabs extend toward the sidewall from the positioning member for the protrusion to be formed thereon.

5. The electronic device as recited in claim 3, wherein two opposite supporting tabs extend toward the sidewall from the positioning member, and the locating post is formed on one of the supporting tabs.

6. A data storage device assembly comprising:
a chassis;
a data storage device with a groove defined in a sidewall thereof;
a supporting bracket mounted to the chassis for receiving the data storage device, the supporting bracket having a sidewall defining a through hole, two opposite locking tabs extending from the sidewall, each locking tab having a protrusion thereon; and
a positioning member pivotably mounted to the sidewall of the supporting bracket, the positioning member having a recess at each end thereof for engaging with the protrusion thereby locating the positioning member, and a positioning pin extending through the through hole to engage in the groove for securing the data storage device in the supporting bracket.

7. The data storage device assembly as recited in claim 6, wherein a pair of supporting tabs extends from the sidewall of the supporting bracket for mounting the positioning member.

8. The data storage device assembly as recited in claim 7, wherein a pivoting hole is defined in each supporting tab for pivotably mounting the positioning member.

9. The data storage device assembly as recited in claim 8, wherein the positioning member further forms two locating posts engaging in the pivoting holes for pivotably mounting the positioning member on the supporting bracket.

10. A mounting apparatus for a data storage device comprising:
a chassis;
a supporting bracket attached to the chassis, the supporting bracket having a sidewall defining a through hole therein;
a positioning member pivotably mounted to the supporting bracket, the positioning member having a locking portion and an unlocking portion, the locking portion having a positioning pin extending through the through hole for securing the data storage device in the supporting bracket; and
interlockable structures carried by the supporting bracket and the positioning member for locating the positioning member on the supporting bracket, whereby when the unlocking portion is pushed, the interlockable structures are disengaged and the positioning pin is disengaged from the data storage device.

11. The mounting apparatus for a data storage device as recited in claim 10, wherein the interlockable structures comprise a through slot defined in the supporting bracket and a protrusion formed on the positioning member for engaging in the through slot.

12. The mounting apparatus for a data storage device as recited in claim 11, wherein a locking tab extends inwards from the positioning member for the protrusion formed thereon.

13. The mounting apparatus for a data storage device as recited in claim 11, wherein the sidewall is bent vertically inwards to form a flange, and the through slot is defined in the flange.

14. The mounting apparatus for a data storage device as recited in claim 13, wherein the flange of the supporting bracket defines a pivoting hole, and the positioning member further forms a locating post engaging in the pivoting hole for pivotably mounting the positioning member on the supporting bracket.

15. The mounting apparatus for a data storage device as recited in claim 10, wherein the interlockable structures comprise a recess defined at each end of the positioning member and a protrusion formed on the supporting bracket for engaging in the recess.

16. The mounting apparatus for a data storage device as recited in claim 15, wherein two opposite locking tabs extend vertically from the sidewall of the supporting bracket for the protrusion formed thereon.

17. The mounting apparatus for a data storage device as recited in claim 15, wherein a pair of supporting tabs extends from the sidewall of the supporting bracket for mounting the positioning member.

18. The mounting apparatus for a data storage device as recited in claim 17, wherein a pivoting hole is defined in each supporting tab for pivotably mounting the positioning member.

19. The mounting apparatus for a data storage device as recited in claim 18, wherein the positioning member forms two locating posts engaging in the pivoting holes for pivotably mounting the positioning member on the supporting bracket.

20. The mounting apparatus for a data storage device as recited in claim 10, wherein the chassis has a front panel, and an opening is defined in the front panel thereof for gaining access to the data storage device.

* * * * *